US009529075B2

(12) United States Patent
Seitz et al.

(10) Patent No.: US 9,529,075 B2
(45) Date of Patent: Dec. 27, 2016

(54) CONCEPT FOR DETERMINING AN ORIENTATION OF A MOBILE DEVICE

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Jochen Seitz, Nuremberg (DE); Thorsten Vaupel, Homberg (DE); Stephen Haimerl, Seubersdorf (DE); Joern Thielecke, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 62 days.

(21) Appl. No.: 14/162,467

(22) Filed: Jan. 23, 2014

(65) Prior Publication Data
US 2014/0133344 A1 May 15, 2014

Related U.S. Application Data

(63) Continuation of application No. PCT/EP2012/064507, filed on Jul. 24, 2012.
(Continued)

(30) Foreign Application Priority Data

Oct. 26, 2011 (EP) .................................... 11186790

(51) Int. Cl.
G01R 31/08 (2006.01)
G01S 5/10 (2006.01)
(Continued)

(52) U.S. Cl.
CPC .. *G01S 5/10* (2013.01); *G01S 3/30* (2013.01); *G01S 5/0247* (2013.01); *H04W 24/08* (2013.01)

(58) Field of Classification Search
USPC .......................... 370/252, 328, 334, 338, 401
See application file for complete search history.

(56) References Cited

U.S. PATENT DOCUMENTS 4,219,821 A 8/1980 Selim
5,077,703 A 12/1991 Strauss
(Continued)

FOREIGN PATENT DOCUMENTS

CN 101526604 A 9/2009
EP 0 002 076 A1 5/1979
(Continued)

OTHER PUBLICATIONS

Castro, P. et al., "A Probabilistic Room Location Service for Wireless Networked Environments", Proceedings on UBICOMP the 3rd International Conference on Ubiquitous Computing 2001, Sep. 2001, 19 pages.
(Continued)

Primary Examiner — Ricky Ngo
Assistant Examiner — Christine Ng
(74) Attorney, Agent, or Firm — Michael A. Glenn; Perkins Coie LLP

(57) ABSTRACT

Embodiments of the present invention provide a mobile device having a receiver and an orientation determiner. The receiver has a plurality of antennas for receiving a signal from a stationary transmitter. Each antenna of the plurality of antennas is arranged to have a different receiving direction. The receiver is configured to detect a signal strength of the signal received with each antenna in order to obtain a plurality of detected signal strengths. The orientation deter-
(Continued)

miner is configured to determine an orientation of the mobile device relative to the stationary transmitter based on the plurality of detected signal strengths.

12 Claims, 12 Drawing Sheets

Related U.S. Application Data

(60) Provisional application No. 61/511,405, filed on Jul. 25, 2011.

(51) Int. Cl.
*G01S 3/30* (2006.01)
*G01S 5/02* (2010.01)
*H04W 24/08* (2009.01)

(56) References Cited

U.S. PATENT DOCUMENTS

| | | | |
|---|---|---|---|
| 7,477,192 B1 | 1/2009 | Haff et al. | |
| 7,640,106 B1* | 12/2009 | Stokar ............... | G01C 21/16 342/147 |
| 8,346,282 B1* | 1/2013 | Dronamraju ......... | H04W 64/00 455/456.1 |
| 2005/0032531 A1* | 2/2005 | Gong ..................... | G01S 3/28 455/456.5 |
| 2005/0052330 A1* | 3/2005 | Mehltretter ........... | H01Q 3/446 343/820 |
| 2007/0188380 A1* | 8/2007 | Duong ................... | G01S 19/36 342/374 |
| 2007/0222685 A1 | 9/2007 | Kuo | |
| 2009/0286548 A1* | 11/2009 | Coronel ................ | H04W 4/20 455/456.1 |
| 2010/0304680 A1* | 12/2010 | Kuffner ................. | H04B 7/10 455/63.1 |
| 2012/0289241 A1* | 11/2012 | Kalliola ................ | G01C 21/20 455/456.1 |
| 2013/0046505 A1* | 2/2013 | Brunner ............... | G01C 21/165 702/141 |
| 2013/0050056 A1* | 2/2013 | Lee ...................... | H01Q 1/2291 343/893 |

FOREIGN PATENT DOCUMENTS

| | | |
|---|---|---|
| GB | 2 243 041 | 10/1991 |
| GB | 2 243 041 A | 10/1991 |
| IE | 912391 | 1/1992 |
| JP | 09-5416 A | 1/1997 |
| JP | 11-64477 A | 3/1999 |
| JP | 2002291021 A | 10/2002 |
| JP | 2006234683 | 9/2006 |
| KR | 1020110061978 A | 6/2011 |
| WO | WO2011/045425 A1 | 4/2011 |

OTHER PUBLICATIONS

Haeberlen, A. et al., "Practical Robust Localization over Large-Scale 802.11 Wireless Networks", Proceedings on MOBICOM the 10th Annual International Conference on Mobile Computing and Networking 2004, Sep. 26-Oct. 1, 2004, 15 pages.
Ibach, P. et al., "'MagicMap—Kooperative Positionsbestimmung über WLAN'", Proceedings on the Chaos Communication Congress 2004, Dec. 2004, 8 pages.
Jahn, J. et al., "Comparison and Evaluation of Acceleration Based Step Length Estimators for Handheld Devices", Proceedings on the 13th International Conference on Indoor Positioning and Indoor Navigation (IPIN 2010, Sep. 15-17, 2010, 6 pages.
Kraft, E. , "A Quaternion-based Unscented Kalman Filter for Orientation Tracking", Proceedings on the 6th International Conference of Information Fusion, CAIRNS 2003, Jul. 8-11, 2003, pp. 47-54.
Meyer, S. et al., "Wi-fi coverage and propagation for localization purposes in permanently changing urban areas", Proceedings on IADIS the International Conference Wireless Applications and Computing 2008, Jul. 2008, 7 pages.
Schilit, B. et al., "Challenge: Ubiquitous Location-Aware Computing and the "Place Lab" initiative", Proceedings on the 1st ACM International Workshop on Wireless Mobile Applications and Services on WLAN Hotspots 2003, Sep. 19, 2003, 7 pages.
Seitz, J. et al., "A Hidden Markov Model for Pedestrian Navigation", Proceedings on WPNC the 7th Workshop on Positioning, Navigation and Communication 2010, Mar. 11-12, 2010, pp. 120-127.
Seitz, J. et al., "A Hidden Markov Model for Urban Navigation Based on Fingerprinting and Pedestrian Dead Reckoning", Proceedings on the 13th International Conference on Information Fusion 2010, Jul. 26-29, 2010, 8 pages.
Teuber, A. et al., "'WLAN Indoor Positioning Based on Euclidean Distances and Fuzzy Logic'", Proceedings of the 3rd Workshop on Positioning, Navigation and Communication (WPNC 2006), Mar. 16, 2006, pp. 159-168.
Vaupel, T. et al., "'Wi-Fi Positioning: System Considerations and Device Calibration'", Proceedings on the 13th International Conference on Indoor Positioning and Indoor Navigation (IPIN 2010), Sep. 15-17, 2010, 7 pages.
Welch, G. et al., "An Introduction to the Kalman Filter", 1995, University of North Carolina at Chapel Hill, Sep. 17, 1997, pp. 1-16.
Bahl, P et al., "RADAR: an in-building RF-based user location and tracking system", INFOCOM 2000, Nineteenth Annual Joint Conference of The IEEE Computer and Communications Societies. Proceedings Piscataway, NJ, USA, vol. 2, XP010376167, Mar. 26-30, 2000, 775-784.
Castro, P. et al., "A probabilistic room location service for wireless networked environments", Proceedings on UBICOMP the 3rd International Conference on Ubiquitous Computing 2001.
Haeberlen, A. et al., "Practical robust localization over large-scale 802.11 wireless networks", Proceedings on MOBICOM the 10th Annual International Conference on Mobile Computing and Networking 2004.
Ibach, P. et al., "'Magicmap—Kooperative Positionsbestimmung über WLAN'", Proceedings on the Chaos Communication Congress 2004.
Jahn, J. et al., "Comparison and evaluation of acceleration based step length estimators for handheld devices", Proceedings on the 13th International Conference on Indoor Positioning and Indoor Navigation (IPIN 2010).
Kraft, E. , "'A quaternion-based unscented kalman filter for orientation tracking'", Proceedings on the 6th International Conference of Information Fusion, CAIRNS 2003.
Meyer, S. et al., "Wi-fi coverage and propagation for localization purposes in permanently changing urban areas", Proceedings on IADIS the International Conference Wireless Applications and Computing 2008.
Schilit, B. et al., "Challenge: Ubiquitous location-aware computing and the place lab initiative", Proceedings on the 1 st ACM International Workshop on Wireless Mobile Applications and Services on WLAN Hotspots 2003.
Seitz, J. et al., "A hidden markov model for pedestrian navigation", Proceedings on WPNC the 7th Workshop on Positioning, Navigation and Communication 2010.
Seitz, J. et al., "A hidden markov model for urban navigation based on fingerprinting and pedestrian dead reckoning", Proceedings on the 13th International Conference on Information Fusion 2010.
Tueber, A. et al., "'Wlan indoor positioning based on euclidean distances and fuzzy logic'", Proceedings on WPNC the 3rd Workshop on Positioning, Navigation and Communication 2006.
Vaupel, T. et al., "'Wi-fi positioning: System considerations and device calibration'", Proceedings on the 13th International Conference on Indoor Positioning and Indoor Navigation (IPIN 2010.
Wallbaum, M. , "'Ph.D. thesis'", 2005, RWTH AACHEN University article 'Indoor geolocation using wireless local area networks', p. 17.

(56) References Cited

OTHER PUBLICATIONS

Welch, G. et al., "An introduction to the kalman filter", 1995, University of North Carolina at Chapel Hill.
Youssef, M. et al., "'The horus location determination system'", Wireless Networks vol. 14, No. 3, 2008, pp. 357-374.

* cited by examiner

CONCEPT FOR DETERMINING AN ORIENTATION OF A MOBILE DEVICE

CROSS-REFERENCE TO RELATED APPLICATIONS

This application is a continuation of copending International Application No. PCT/EP2012/064507, filed Jul. 24, 2012, which is incorporated herein by reference in its entirety, and additionally claims priority from U.S. Provisional Application No. 61/511,405, filed Jul. 25, 2011, and from European Application No. 11186790.9, filed Oct. 26, 2011, which are also incorporated herein by reference in their entirety.

BACKGROUND OF THE INVENTION

Embodiments of the present invention relate to a concept for determining an orientation of a mobile device. Some embodiments of the present invention relate to a concept for Wi-Fi attitude and position tracking.

Modern smart phones are equipped with a variety of sensors. For positioning, satellite receivers, GSM (Global System for Mobile Communications) modules and wireless LAN (Local Area Network) modules can be used. Based on them, new and cheap approaches to pedestrian navigation can be provided. This enables new types of location based services for pedestrians ranging from calls for taxis, finding points of interests to city and museum guides.

Commonly the first choice for navigation is the Global Positioning System (GPS). However, the lack of precision and availability of GPS in urban and indoor environments is a prevalent problem. With the popular use of assisted GPS (A-GPS) in smart phones the startup time to the first GPS position fix and power consumption can be reduced. But, if signals are too week for detection, positioning fails. Moreover, outdoors the horizontal attitude of a device can be easily detected using electronic compasses. Nevertheless, indoors magnetic disturbances lead to unreliable compass outputs.

As an alternative or complementary solution for indoor environments Bahl et al. (Bahl, P., Padmanabhan, V.: Radar: an in-building rf-based user location and tracking system. In: Proceedings on INFOCOM the 19th Annual Joint Conference of the IEEE Computer and Communications Societies, Tel Aviv, Israel (2000)) suggested a positioning approach based on the received signal strength (RSS) in Wi-Fi™ (Wi-Fi: http://www.wi-fi.org/. Wi-Fi is a registered trademark of the Wi-Fi Alliance (2003)) networks. Nowadays, because of an increasing number of public and private access points, Wi-Fi positioning becomes more and more attractive for pedestrian navigation (Meyer, S., Vaupel, T., Haimerl, S.: Wi-fi coverage and propagation for localization purposes in permanently changing urban areas. In: Proceedings on IADIS the international Conference Wireless Applications and Computing, Amsterdam, The Netherlands (2008)) and is already integrated into many smart phones.

One remaining challenge in tracking pedestrians is estimating the heading of a person. Pedestrians move very slow and can turn anytime without changing their position. So, the speed vector of a pedestrian calculated from consecutive positions has a very low accuracy. The positioning accuracy can be improved by combining Wi-Fi positioning with dead reckoning, using low cost sensors as proposed in Seitz, J., Vaupel, T., Meyer, S., Gutierrez Boronat, J., Thielecke, J.: A hidden markov model for pedestrian navigation, in: Proceedings on WPNC the 7th Workshop on Positioning, Navigation and Communication, Dresden, Germany (2010); Seitz, J., Vaupel, T., Jahn, J., Meyer, S., Gutierrez Boronat, J., Thielecke, J.: A hidden markov model for urban navigation based on fingerprinting and pedestrian dead reckoning, in: Proceedings on the 13th International Conference on Information Fusion, Edinburgh, United Kingdom (2010). For pedestrians, dead reckoning can be improved by step detection, as analyzed in Jahn, J., Batzer, U., Seitz, J., Patiño Studencka, L., Gutierrez Boronat, J.: Comparison and evaluation of acceleration based step length estimators for handheld devices. In: Proceedings on the 13th International Conference on Indoor Positioning and Indoor Navigation (IPIN), Zurich, Switzerland (2010). But estimating the attitude is still challenging.

Moreover, in the Article Wallbaum, M.: Indoor geolocation using wireless local area networks. Ph.D. thesis, Department of Computer Science, RWTH Aachen University (2005) 17. Welch, G., Bishop, G.: An introduction to the kalman filter. University of North Carolina at Chapel Hill, Chapel Hill, N.C., USA (1995) the specific problem of determining the position of objects and people within buildings is focused on. Thereby, a low-cost approach is based on wireless LANs, which are now widely deployed.

Wi-Fi positioning methods can be divided into two groups. The first group needs a database with the positions and the signal strength of known Wi-Fi access points, see e.g. in Skyhook Wireless: http://www.skyhookwireless.com and Schilit, B., LaMarca, A., Borriello, G., Griswold, W., McDonald, D., Lazowska, E., Balachandran, A., Hong, J., Iverson, V.: Challenge: Ubiquitous location-aware computing and the place lab initiative. In: Proceedings on the 1st ACM international workshop on Wireless mobile applications and services on WLAN hotspots, San Diego, Calif., USA (2003), and the second group needs a database of so called fingerprints, e.g. in Bahl, P., Padmanabhan, V.: Radar: an in-building rf-based user location and tracking system, in: Proceedings on INFOCOM the 19th Annual Joint Conference of the IEEE Computer and Communications Societies, Tel Aviv, Israel (2000); Castro, P., Chiu, P., Kremenek, T., Muntz, R.: A probabilistic room location service for wireless networked environments, in: Proceedings on UBICOMP the 3rd International Conference on ubiquitous computing, Atlanta, Ga., USA. Springer (2001); Haeberlen, A., Flannery, E., Ladd, A., Rudys, A., Wallach, D., Kavraki, L.: Practical robust localization over large-scale 802.11 wireless networks, in: Proceedings on MobiCom the $10^{th}$ annual international conference on mobile computing and networking, Philadelphia, Pa., USA (2004); Ibach, P., Hbner, T., Schweigert, M.: Magicmap-kooperative positionsbestimmung ber wlan, in: Proceedings on the Chaos Communication Congress, Berlin, Germany (2004); Teuber, A., Eissfeller, B.: Wlan indoor positioning based on euclidean distances and fuzzy logic, In: Proceedings on WPNC the 3rd Workshop on Positioning, Navigation and Communication, Hannover, Germany (2006) and Youssef, M., Agrawala, A.: The horus location determination system, Wireless Networks 14(3), 357-374 (2008).

A fingerprinting database can be created by previously gathered RSS measurements. These are then referenced with the coordinates of the positions where they have been observed. Thus, one fingerprint contains a geo-referenced position, RSS values and the corresponding identifiers of the received access points. For positioning, fingerprinting is done by correlating current RSS measurements with the entries of the fingerprints in the database. Then, after selecting the best matching fingerprints, the user position can, for example, be calculated by a mean of the fingerprint positions weighted by their correlation results. More details on fingerprinting can be found in Bahl, P., Padmanabhan, V.: Radar: an in-building rf-based user location and tracking system, in: Proceedings on INFOCOM the 19th Annual Joint Conference of the IEEE Computer and Communications Societies, Tel Aviv, Israel (2000).

Each environment has a characteristical signal propagation. The RSS at a specific position depends on the path loss, shadowing by objects and multipath propagation. The higher the density of shadowing objects, the higher is the accuracy of Wi-Fi positioning, as different fingerprints are less similar in signal space. Therefore, indoors Wi-Fi positioning works very well because of the building structure and furniture. Outdoors, especially on large squares, the database correlation results in ambiguities.

To get meaningful Wi-Fi positioning results, in practice at least three access points are observed. An advantage of Wi-Fi positioning in urban environments is that the infrastructure is already set up. Existing private and public access points can be used. But on the other hand, positioning suffers from unobserved changes over time and the number of available access points varies from one place to another. An analysis of database changes can be found in Meyer, S., Vaupel, T., Haimerl, S.: Wi-fi coverage and propagation for localization purposes in permanently changing urban areas. In: Proceedings on IADIS the international Conference Wireless Applications and Computing, Amsterdam, The Netherlands (2008).

As reported in Meyer, S., Vaupel, T., Haimerl, S.: Wi-fi coverage and propagation for localization purposes in permanently changing urban areas, in: Proceedings on IADIS the international Conference Wireless Applications and Computing, Amsterdam, The Netherlands (2008) and Vaupel, T., Seitz, J., Kiefer, F., Haimerl, S., Thielecke, J.: Wi-fi positioning: System considerations and device calibration, in: Proceedings on the 13th International Conference on Indoor Positioning and Indoor Navigation (IPIN), Zurich, Switzerland (2010), several methods are used to collect the measurements to build up the fingerprinting database.

FIG. 1 shows a representation of a geographic area indicating fingerprinting positions and the number of detected access points at each position. As a testbed for positioning, metropolitan areas of several major cities in Germany (including Berlin, Hamburg, Nuremberg and Munich) are used by the Fraunhofer IIS. In FIG. 1, a part of the database covering the city center of Nuremberg is presented. There, on average a fingerprint contains 21 access points, if there is coverage at all. In other words, FIG. 1 shows an example extracted from the Fraunhofer IIS Awiloc® fingerprinting database in Nuremberg, visualized on an openstreetmaps.org map. Thereby, dots indicate fingerprint positions and the amount of detected access points at each position, as depicted in the scale-up.

Wi-Fi positioning can be well used for localization in urban areas, because the density of receivable access points is high enough there. Especially indoors, Wi-Fi positioning offers reliable localization results, but a cheap and reliable attitude estimation system for indoor environments is missing. Ferromagnetic materials in building structures cause large magnetic disturbances that lead to unreliable compass headings. Inertial Navigation Systems (INS) based on micro electromechanical systems (MEMS) suffer from large drift errors with increasing time. This problem can be partially solved by sensor data fusion (Kraft, E.: A quaternion-based unscented kalman filter for orientation tracking. In: Proceedings on the 6th International Conference of Information Fusion, Cairns, Queensland, Australia (2003)).

SUMMARY

According to an embodiment, a device may have: a receiver having a plurality of antennas for receiving at least three signals from at least three Wi-Fi access points, wherein each antenna of the plurality of antennas is arranged to have a different receiving direction, and wherein the receiver is configured to detect signal strengths of the at least three signals received with each antenna in order to obtain a plurality of detected signal strengths for each signal of the at least three signals; an orientation determiner configured to determine an orientation of the device relative to the at least three Wi-Fi access points based on the plurality of detected signal strengths for each signal of the at least three signals and based on a Wi-Fi fingerprinting database; and a position determiner configured to determine a position of the device relative to the at least three Wi-Fi access points based on the plurality of detected signal strengths for each signal of the at least three signals and based on the Wi-Fi fingerprinting database.

According to another embodiment, a method for operating a device may have the steps of: receiving at least three signals from at least three Wi-Fi access points with a receiver having a plurality of antennas, wherein each antenna of the plurality of antennas is arranged to have a different receiving direction; detecting signal strengths of the at least three signals received with each antenna in order to obtain a plurality of detected signal strengths for each signal of the at least three signals; determining an orientation of the device relative to the at least three Wi-Fi access points based on the plurality of detected signal strengths for each signal of the at least three signals and based on a Wi-Fi fingerprinting database; and determining a position of the device relative to the at least three Wi-Fi access points based on the plurality of detected signal strengths for each signal of the at least three signals and based on the Wi-Fi fingerprinting database.

Another embodiment may have a computer program having a program code for performing, when running on a computer or microprocessor, the above method for operating a device.

Embodiments of the present invention provide a mobile device comprising a receiver and an orientation determiner. The receiver comprises a plurality of antennas for receiving a signal from a stationary transmitter. Each antenna of the plurality of antennas is arranged to have a different receiving direction. The receiver is configured to detect a signal strength of the signal received with each antenna in order to obtain a plurality of detected signal strengths. The orientation determiner is configured to determine an orientation of the mobile device relative to the stationary transmitter based on the plurality of detected signal strengths.

According to the concept of the present invention, the signal of the stationary transmitter is received with the plurality of antennas. Since the plurality of antennas are arranged to have different receiving directions, each antenna of the plurality of antennas receives the signal with a characteristic or different signal strength that can be measured or detected by the receiver. Hence, the orientation of the mobile device relative to the transmitter can be determined by the orientation determiner based on the plurality of detected signal strengths.

BRIEF DESCRIPTION OF THE DRAWINGS

Embodiments of the present invention are described herein making reference to the appended drawings, in which:

FIG. 5b shows a polar diagram of measured and simulated antenna gains of the four antennas shown in FIG. 5a;

DETAILED DESCRIPTION OF THE INVENTION

Figure 1:
FIG. 1 shows a representation of a geographic area indicating fingerprinting positions and the number of detected access points at each position.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 2:
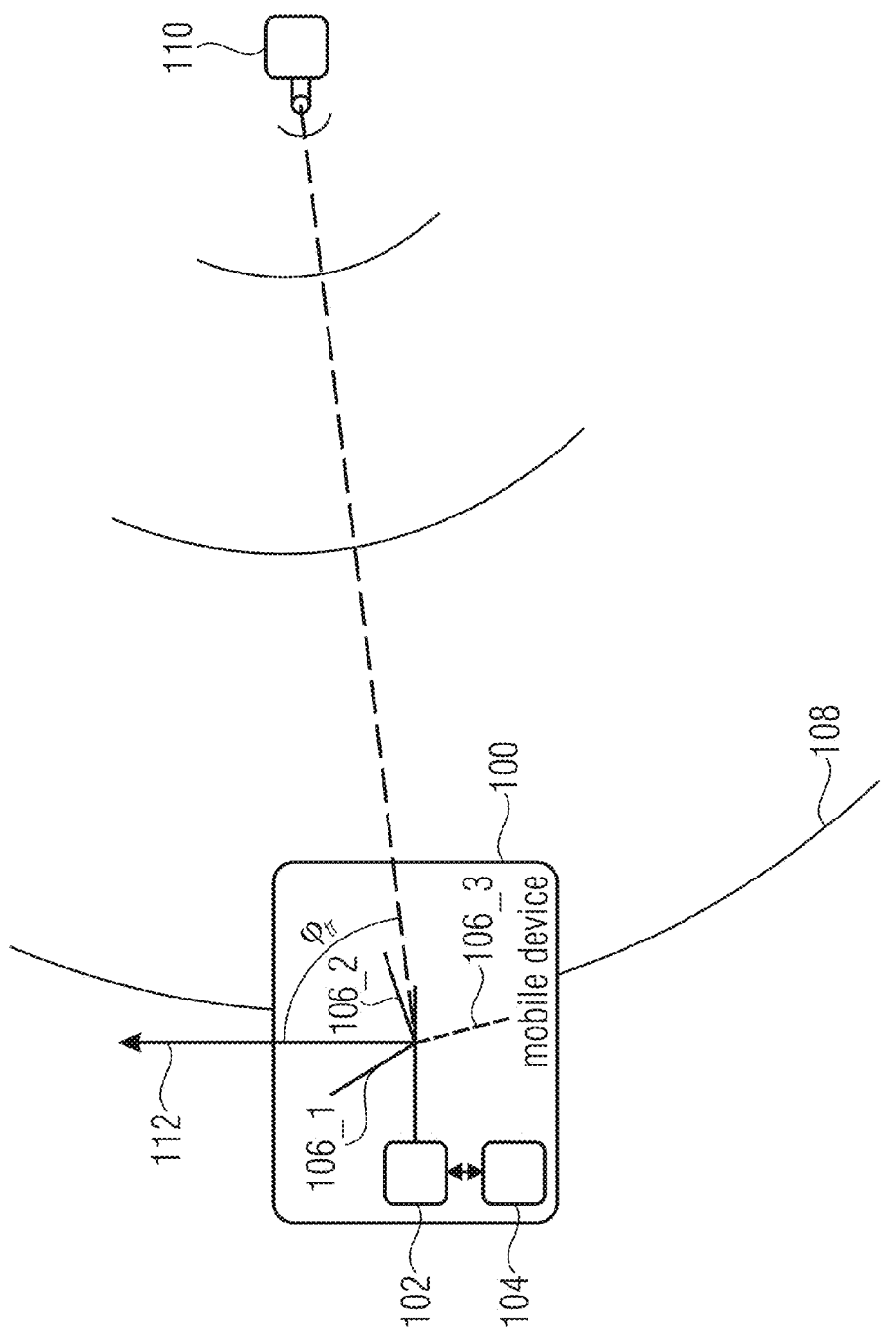
FIG. 2 shows a block diagram of a mobile device according to an embodiment of the present invention.

FIG. 2 shows a block diagram of a mobile device 100 according to an embodiment of the present invention. The mobile device 100 comprises a receiver 102 and an orientation determiner 104. The receiver 102 comprises a plurality of antennas 106_1 to 106_n for receiving a signal 108 from a stationary transmitter 110. Each antenna of the plurality of antennas 106_1 to 106_n is arranged to have a different receiving direction. The receiver 102 is configured to detect a signal strength of the signal 108 received with each antenna of the plurality of antennas 106_1 to 106_n in order to obtain a plurality of detected signal strengths. The orientation determiner 104 is configured to determine an orientation 112 of the mobile device 100 relative to the stationary transmitter 110 based on the plurality of detected signal strengths.

According to the concept of the present invention, the signal 108 of the stationary transmitter 110 is received with the plurality of antennas 106_1 to 106_n. Since the plurality of antennas 106_1 to 106_n are arranged to have different receiving directions, each antenna of the plurality of antennas 106_1 to 106_n receives the signal 108 with a characteristic or different signal strength that can be measured or detected by the receiver 102 of the mobile device 100. Hence, the orientation of the mobile device 100 relative to the transmitter 110 can be determined by the orientation determiner 104 based on the plurality of detected signal strengths.

In embodiments, the receiver 102 of the mobile device 100 can comprise up to n antennas 106_1 to 106_n, wherein n is a natural number greater than or equal to two (n≥2). For example, as shown in FIG. 2, the receiver 102 can comprise two antennas 106_1 and 106_n (n=2). Moreover, in FIG. 2 it is indicated that the receiver 102 of the mobile device 100 may also comprise three antennas 106_1 to 106_n (n=3).

As shown in FIG. 2, the orientation 112 of the mobile device 100 can be indicated by an arrow for illustration purposes. In addition, the relative orientation between the mobile device 100 and the stationary transmitter 110 can be described by an angle $\phi_{tr}$ as indicated in FIG. 2.

In embodiments, the plurality of antennas 106_1 to 106_n can be arranged such that the receiving directions of the plurality of antennas 106_1 to 106_n lie in one plane. For example, the one plane can be arranged such that the one plane is aligned to or parallel to a main transmit direction of an antenna of the transmitter 110.

Furthermore, the one plane can be arranged parallel to a main surface of the mobile device 100 that is allocated in a normal operation towards a user of the mobile device 100. For example, the mobile device 100 can comprise a display for displaying the (current) orientation of the mobile device 100. Thereby, the user will normally hold the mobile device 100 such that the display is visible to him. Hence, the main surface of the mobile device 100 can be the surface comprising the display or the display itself. Alternatively, the one plane can be arranged such that the one plane is aligned horizontally perpendicular to a gravitational vector) or nearly horizontally in normal operation, e.g. when the user holds the mobile device 100 for orientation determination.

Moreover, the orientation determiner 104 can be configured to determine the orientation 112 of the mobile device 100 such that the orientation 112 of the mobile device 100 is a horizontal orientation of the mobile device 100 perpendicular to an earth gravitational vector.

Naturally, the receiver 102 comprising the plurality of antennas 106_1 to 106_n can be configured to receive i signal(s) from i stationary transmitter(s), wherein i is a natural number greater than or equal to one (i≥1). Therefore, in the following, the functionality of the mobile device 100 is described by example in an environment with at least three stationary transmitters.

Figure 3:
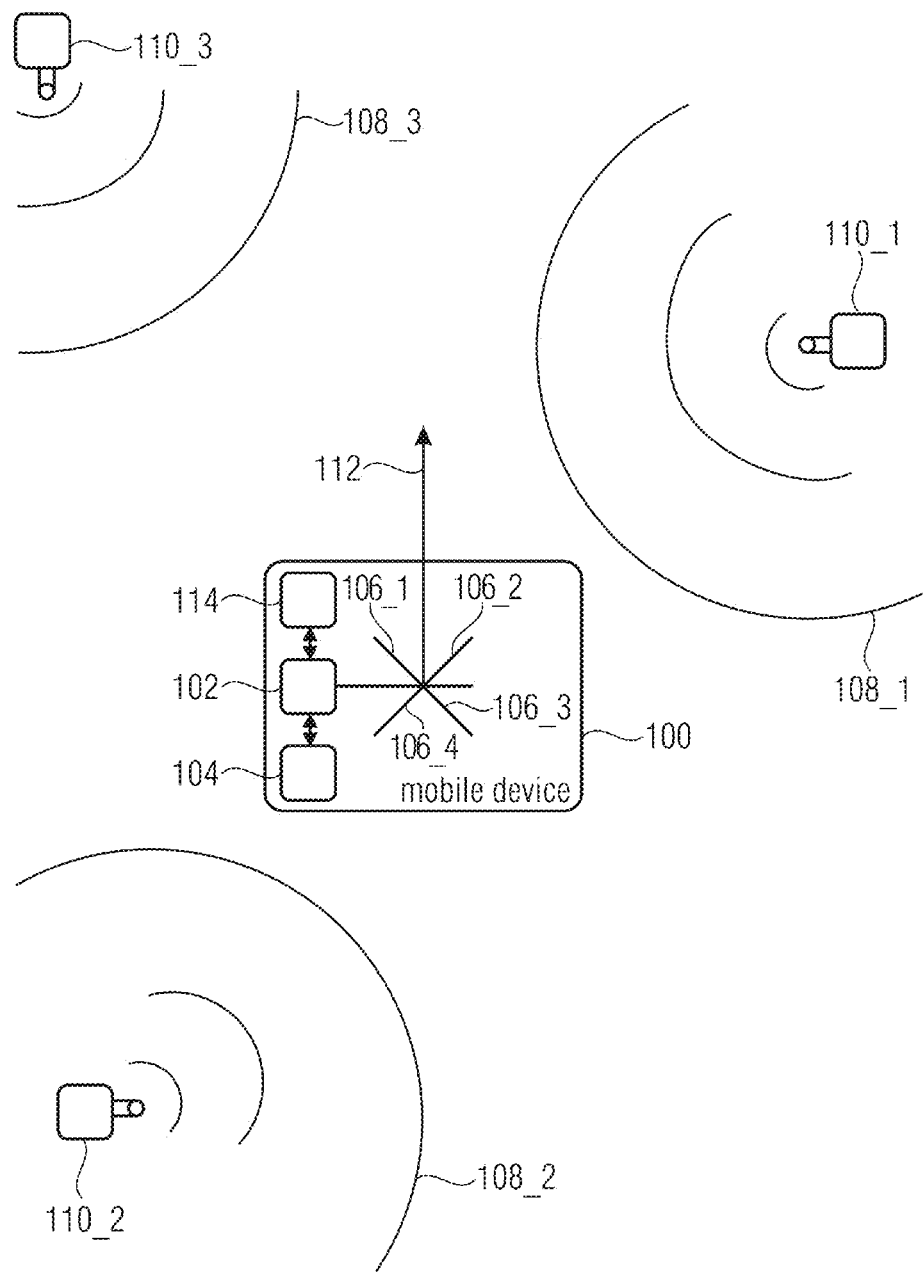
FIG. 3 shows a block diagram of the mobile device shown in FIG. 2 in an environment with at least three stationary transmitters according to an embodiment of the present invention.

FIG. 3 shows a block diagram of the mobile device 100 shown in FIG. 2 in an environment with at least three stationary transmitters 110_1 to 110_i (n=3) according to an embodiment of the present invention. The receiver 102 comprising the plurality of antennas 106_1 to 106_n is configured to receive at least three signals 108_1 to 108_i (i=3) from at least three stationary transmitters 110_1 to 110_i (i=3). The receiver 102 is configured to detect a signal strength of the at least three signals 108_1 to 108_i (i=3) with each antenna of the plurality of antennas 106_1 to 106_n in order to obtain a plurality of signal strengths for each signal of the at least three signals 108_1 to 108_i (i=3). Thereby, the orientation determiner 104 is configured to determine the orientation 112 of the mobile device 100 relative to the at least three stationary transmitters 110_1 to 110_i (i=3) based on the plurality of detect signal strengths for each signal of the at least three signals 108_1 to 108_i (i=3).

As shown in FIG. 3, the receiver 102 of the mobile device 100 can comprise four antennas 106_1 to 106_n (n=4), wherein the four antennas 106_1 to 106_n (n=4) can be arranged such that the receiving directions of the four antennas 106_1 to 106_n (n=4) are orthogonal to each other. Furthermore, the four antennas 106_1 to 106_n (n=4) can be arranged such that the receiving directions of the four antennas 106_1 to 106_n (n=4) lay in one plane as already described above.

Therefore, the receiver 102 comprising the four antennas 106_1 to 106_n (n=4) shown in FIG. 3 will detect a signal strength with each of the four antennas 106_1 to 106_n (n=4) for each signal of the at least three signals 108_1 to 108_i (i=3) received from the at least three stationary transmitters 110_1 to 110_i (i=3). In other words, the receiver 102 of the mobile device 100 shown in FIG. 3 will detect four signal strengths of the signal 108_1 received from the stationary transmitter 110_1, four signal strengths of the signal 108_2 received from the transmitter 110_2, and four signal strengths of the signal 108_3 received from the stationary transmitter 110_3.

The at least three transmitters 110_1 to 110_i (i=3) shown in FIG. 3 can be transceivers, such as Wi-Fi access points. Hence, the receiver 102 comprising the plurality of antennas 106_1 to 106_n (n=4) can be configured to receive the at least three signals 108_1 to 108_i (i=3) from the at least three stationary transmitters 110_1 to 110_i (i=3) such that the at least three stationary transmitters 110_1 to 110_i (i=3) are Wi-Fi access points. In embodiments, Wi-Fi refers to a wireless local area network according to the IEEE 802.11 specification, such as 802.11a, 802.11b, 802.11c, 802.11d, 802.11e, 802.11f, 802.11g, 802.11h, 802.11i, 802.11j, 802.11n and the like.

Moreover, the mobile device 100 can further comprise a position determiner 114 configured to determine the position of the mobile device 100 relative to the at least three Wi-Fi access points 110_1 to 110_i (i=3) based on the plurality of detected signal strengths for each signal of the at least three signals 108_1 to 108_i (i=3).

In the following, implementation examples of the mobile device 100 shown in FIG. 3 comprising the receiver 102 with the four antennas 106_1 to 106_n (n=4), the orientation determiner 104 and the position determiner 114 are described. Or in other words, in the following, the approach for indoor attitude (orientation or headed) and position estimation according to the concept of present invention is presented. Thereby, no additional sensors are used, only a special antenna setup 106. Naturally, the following description is also applicable to the mobile device 100 shown in FIG. 2.

Figure 4:
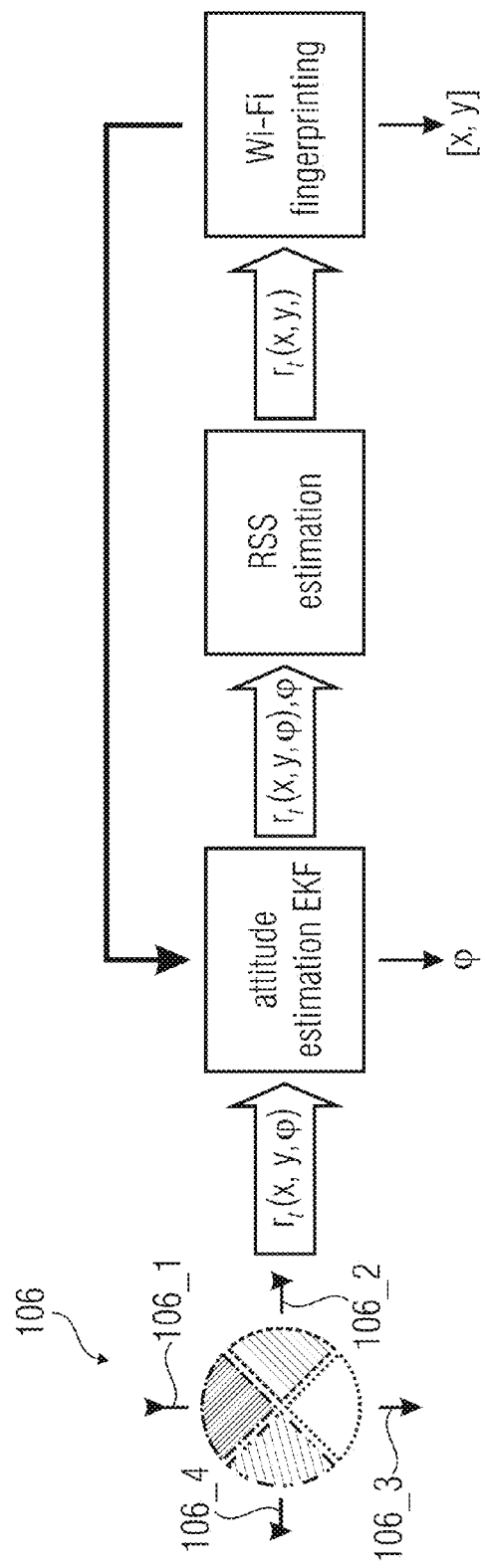
FIG. 4 shows an illustrative view of an iterative attitude and position estimation process using RSS measurements detected with an antenna setup 106 comprising four directional antennas.

FIG. 4 shows an illustrative view of an iterative attitude and position estimation process using RSS measurements of an antenna setup 106 with four directional antennas 106_1 to 106_n (n=4). RSS measurements are collected simultaneously with a setup 106 of four directional antennas 106_1 to 106_n (n=4) horizontally headed in orthogonal directions (receiving directions). Thereby, the RSS measurements $r_t(x, y, \phi)$ at time t depend on the position (x, y) and the attitude angle $\phi$ of the setup 106. Using these measurements, at first the attitude of the setup 106 can be estimated. Second, the corresponding RSS values for a standard omni-directional Wi-Fi antenna can be calculated. Third, the position can be estimated using fingerprinting, as already described above in the related art and/or known technology. Reasons for choosing Wi-Fi fingerprinting for determining the position of the mobile device 100 are that fingerprinting is reported to achieve higher precision than access point based methods and generally positions of access points are not public.

The RSS value $P_{Rx}(d, \phi)$ in dB, received in a distance d to a transmitter (access point) 110_1 to 110_i and with an attitude $\phi$ can be modeled as follows:

$$P_{Rx}(d, \varphi) = P_{Tx}(d_0) - 10\eta\log\left(\frac{d}{d_0}\right) + G_{Rx}(\varphi) - \sum_{k=1}^{K} n_k a_k \quad (1)$$

One RSS value is obtained per directional antenna 106_1 to 106_n. $P_{Tx}(d_0)$ is the reference signal strength measured in a distance $d_0$ to the receiver 102. It is followed by the path loss, whereas $\eta$ is the path loss exponent, $G_{Rx}(\phi)$ is the antenna gain. The last subtrahend represents k different shadowing objects on the path of the signal 108. The objects are grouped to $n_k$ objects with equal attenuation $a_k$. Multipath propagation is not considered.

Figure 5A:
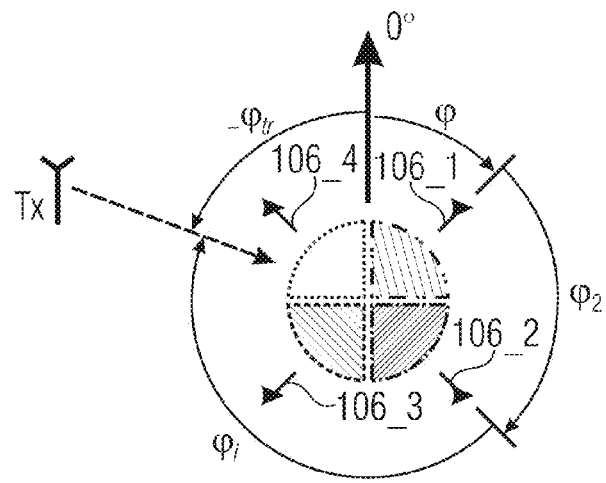
FIG. 5a shows an illustrative view of the orientation of the four antennas relative to a stationary transmitter according to an embodiment of the present invention.

FIG. 5a shows an illustrative view of the orientation $\phi$ of the four antennas 106_1 to 106_n relative to a stationary transmitter 110 according to an embodiment of the present invention. Moreover, FIG. 5a shows a sketch of the antenna setup 106 and the used angles for the directional antenna 106_n (n=2), rotated with $\phi_2$=90° clockwise relative to the attitude $\phi$ of the antenna setup 106. The angle of incidence $\phi_i$ for one antenna 106_n is the angle between the positions of the transceiver 110 and receiver $\phi_{tr}$ relative to a reference direction minus the attitude $\phi$ of the antenna setup 106 and the rotation angle $\phi_n$ of the directional antenna 106_n of the setup 106 that received the signal:

$$\phi_i = \phi_{tr} - \phi - \phi_n \quad (2)$$

Figure 5B:
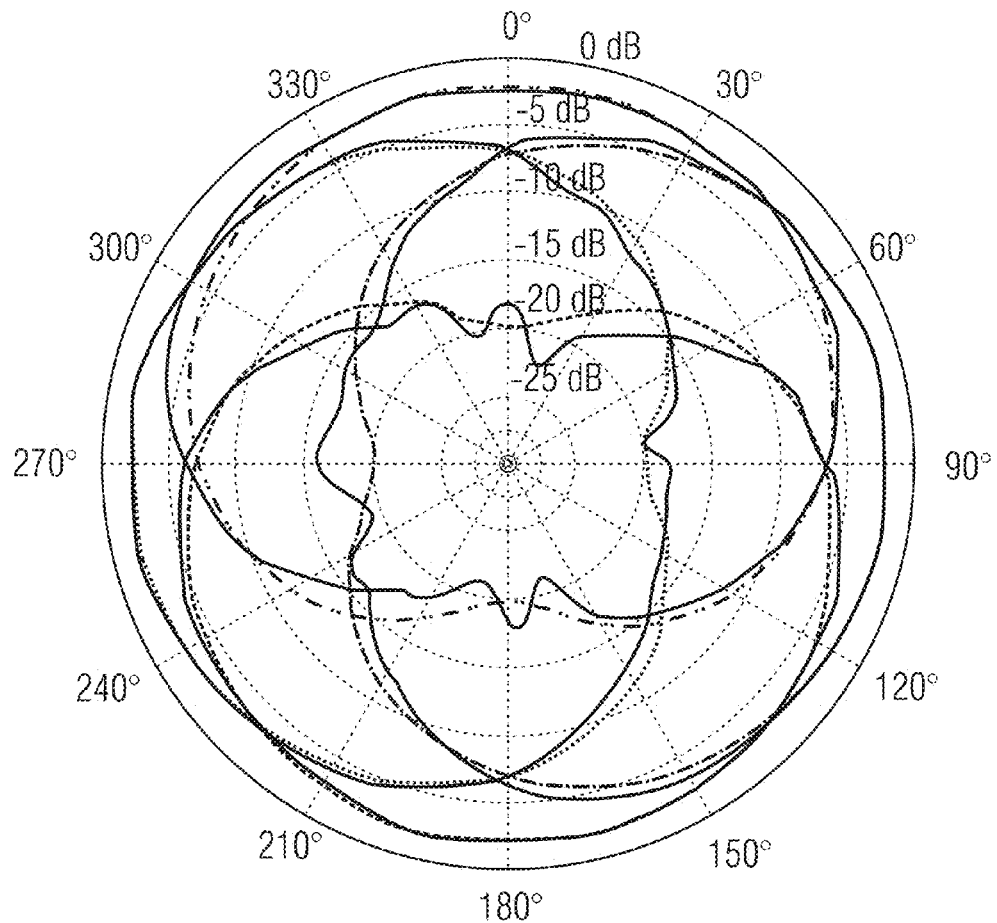

FIG. 5b shows a polar diagram of measured and simulated antenna gains of the four antennas 106_1 to 106_n (n=4) shown in FIG. 5a with $\phi_n \in [0° \ 90° \ 180° \ 270°]$. Thereby, the solid lines describe the measured antenna gains and the dashed lines the simulated antenna gains. In other words, as an example for an antenna setup 106, in FIG. 5b the polar diagram of a special, compact antenna setup 106 is presented together with the results of an approximation of the antenna gains. The antenna setup 106 according to the concept of the present invention is based on four dipole antennas 106_1 to 106_n (n=4) and phase shifters. To approximate the directive gains $G_{Rx}(\phi)$ of the setup 106 a polar equation can be used:

$$G_{Rx,n}(\phi) = 10 \log(A + B \cos(\phi_{tr} - \phi - \phi_n)) \quad (3)$$

A is the isotropic part and B the dipole part of the antenna 106_1 to 106_n, e.g. with A=1 and B=0 we get an omni-directional antenna, with A=0 and B=1 a dipole. For the below presented experimental antenna setup 106, A=0.44 and B=0.34 are the best fit.

To estimate the attitude φ of the antenna setup 106 differences of the RSS values, collected by the directional antennas 106_1 to 106_n, are used in an extended Kalman filter (EKF). An introduction to the EKF can be found in Welch, G., Bishop, G.: An introduction to the kalman filter, University of North Carolina at Chapel Hill, Chapel Hill, N.C., USA (1995). The main advantage of using the differences instead of the absolute values in equation (1) is that the reference signal strength, path loss and attenuation by objects on the direct path can be ignored:

$$P_{Rx,1}(d,\phi) - P_{Rx,2}(d,\phi) = G_{Rx,1}(\phi) - G_{Rx,2}(\phi) \quad (4)$$

Another positive effect is that the sensitivity increases by using the differences. The measurable range increases from 17 dB (FIG. 5b) to 34 dB. This can be important as commercial Wi-Fi cards output RSS values with a sample interval of 1 dB or multiples of that.

In the time update for the presented attitude estimation the a priori estimate of the attitude $\hat{\phi}_k^-$ is calculated. It is assumed that there is no change between two time steps. The a priori estimate of the covariance is then simply the a posteriori covariance from the last step plus the process noise covariance:

$$\hat{\phi}_k^- = \hat{\phi}_{k-1} \quad (5)$$

$$P_k^- = P_{k-1} + Q \quad (6)$$

The random variable $w_k$ represents the process noise assumed with a normal probability distribution $p(w) \propto N(0, Q)$. The Kalman gain $K_k$ can be calculated as:

$$K_k = P_k^- H_k^\theta (H_k P_k^- H_k^\theta + R_k)^{-1}, \text{ with } H_k = \left.\frac{\partial h_k(\varphi)}{\partial \varphi}\right|_{\hat{\varphi}_k^-} \quad (7)$$

Whereas $R_k$ is the measurement noise covariance matrix and $H_k$ relates the state to the measurements. Using RSS differences the correlations between each pair of differences need to be considered in $R_k$. Because $h_k$ is a non-linear function, it is linearized by calculating the Jacobian matrix of the derivative of $h_k$ at $\hat{\phi}_k^-$. The nonlinear measurement equation $h_k(\phi)$ comprises six possible RSS differences. Vector $v_k$ represents the measurement noise assumed with $p(v) \propto N(0,R)$:

$$h_k(\varphi) = \begin{bmatrix} G_{Rx,1}(\varphi) - G_{Rx,2}(\varphi) \\ G_{Rx,1}(\varphi) - G_{Rx,3}(\varphi) \\ G_{Rx,1}(\varphi) - G_{Rx,4}(\varphi) \\ G_{Rx,2}(\varphi) - G_{Rx,3}(\varphi) \\ G_{Rx,2}(\varphi) - G_{Rx,4}(\varphi) \\ G_{Rx,3}(\varphi) - G_{Rx,4}(\varphi) \end{bmatrix} + v_k \quad (8)$$

Finally, in the measurement update the a posteriori state $\hat{\phi}_k$ and covariance $P_k$ can be calculated using the differences of measured RSS in the measurement vector $z_k$:

$$\hat{\phi}_k = \hat{\phi}_k^- + K_k(z_k - h(\hat{\phi}_k^-)) \quad (9)$$

$$P_k = P_k^- - K_k H_k P_k^- \quad (10)$$

In the presented EKF, one iteration step is performed for each detected access point 110_1 to 110_i with each measured $r_t$. So, more than one iteration step is executed per time step. In practice this showed a better performance than using all detected access points 110_1 to 110_i in one step.

Usually, the fingerprinting database is collected with omni-directional Wi-Fi antennas 106_1 to 106_n. Hence, in order to be able to use a common or known fingerprinting database, an equivalent $r_t$ vector can be calculated for a virtual omni-directional antenna. $r_{t,i}$ for access point i by the mean of the results for all four directional antennas using the estimated attitude φ:

$$r_{t,i}(x, y) = \frac{1}{4} \cdot \sum_{n=1}^{4} (r_{t,i}(x, y, \varphi) - 10\log(A + B\cos(\varphi_{tr,i} - \varphi - \varphi_n))) \quad (11)$$

Finally, the position [x, y] can be calculated using fingerprinting, as already described above in the related art and/or known technology.

In the following, simulation results of attitude and position estimation according to the concept of the present invention are compared to simulation results of standard Wi-Fi positioning. Thereby, the performance of the mobile device 100 is evaluated and the positioning errors are analyzed when measured RSS values vary from the database entries. For the simulations, a database with a regular grid with a spacing of 1 m is used.

Figure 6A:
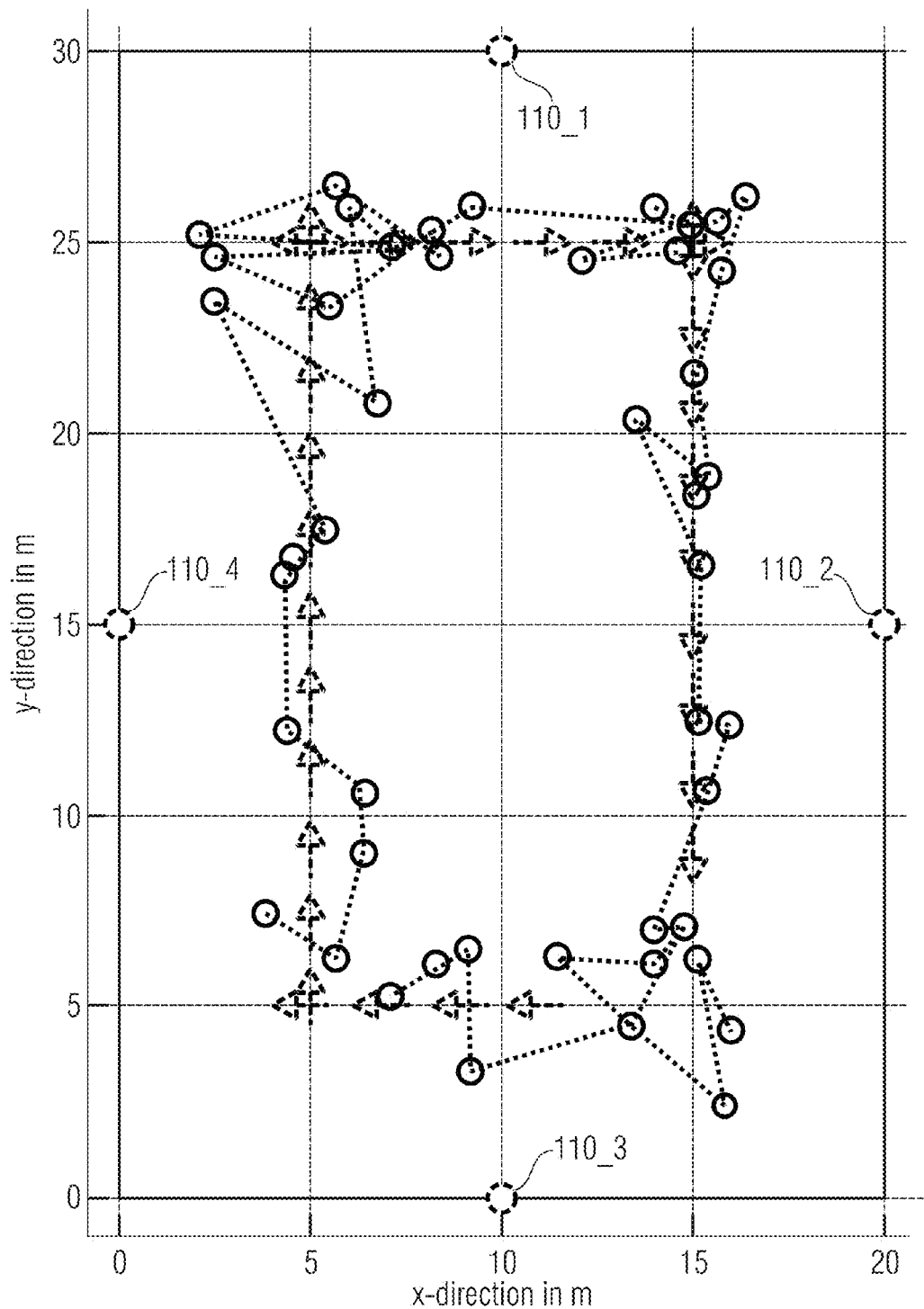
FIG. 6a shows a layout of a simulated area with four access points (grey dots), a reference path with attitudes (grey arrows) and results from standard Wi-Fi positioning (circles)
Figure 6B:
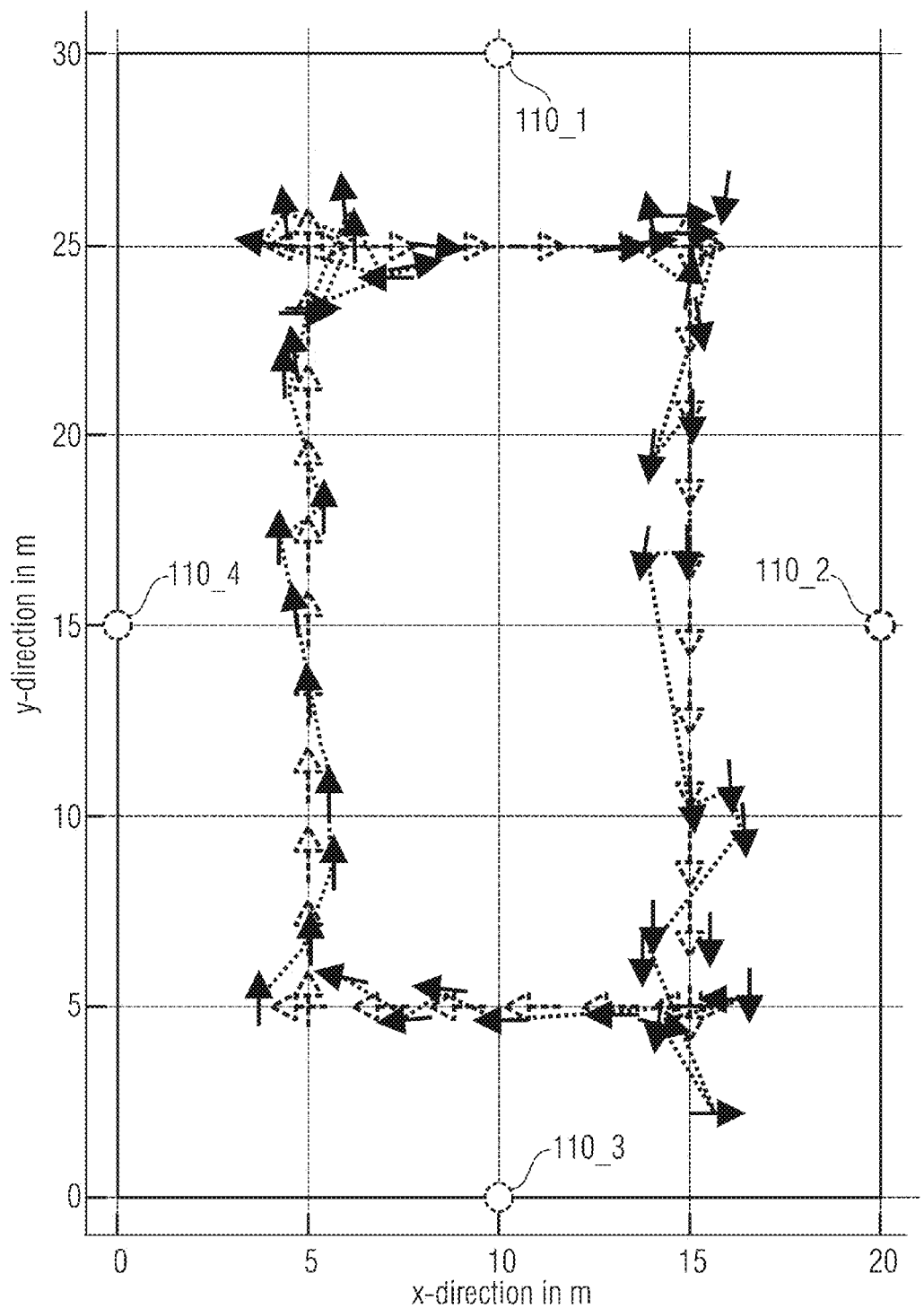
FIG. 6b shows a layout of a simulated area with four access points (grey dots), a reference path with attitudes (grey arrows) and results using the attitude and position tracking (black arrows) according to the concept of the present invention.

In FIGS. 6a and 6b, the size of the grid and the positions of the four access points 110_1 to 110_4 are depicted. Moreover, four additional access points are placed in a distance of 10 m away of the edges of the simulated room. To build up the fingerprinting database for each grid position and each access point 110_1 to 110_i, $P_{Rx}(d)$ is calculated according to equation (1), but for an omni-directional antenna ($G_{Rx}(\phi)=0$).

One simulation path, as depicted in FIGS. 6a and 6b, is divided into 45 RSS measurements $r_t(x,y,\phi)$. It starts at position [5,5] going up to [5,25] following the gray arrows. In the corners the attitude is rotated in 90° steps in order to simulate a person in a museum looking at different objects. Finally, the path ends at the starting position. To simulate RSS measurements database entries are perturbated in two ways. At first, RSS variations for each access point 110_1 to 110_i are created by adding random noise to database entries:

$$r_{t,i}(x,y) = P_{Rx,i}(d) + v_o, \text{ with } p(v_o) \propto N(0,\sigma_o) \quad (12)$$

These RSS variations $v_o$ affect all antennas 106_1 to 106_n (n=4) in the same way. Therefore, these RSS variations $v_o$ can be referred to as omni-directional RSS variations. In reality this can represent environmental changes. The RSS variations are local, but local correlations between measurements have not been accounted for.

Secondly, directional RSS variations are simulated by adding random noise from four directions $\phi_d$, the four antenna directions (receiving directions) for simplicity. Directional RSS variations can be caused by small environmental changes, affecting just a part of the signal propagation paths. For an omni-directional antenna these four directional variations superpose additive:

$$r_{t,i}(x, y) = P_{Rx,i}(d) + \sum_{n=1}^{4} v_{d,n}, \text{ with } p(v_{d,n}) \propto N(0, \sigma_d) \quad (13)$$

For each directional antenna 106_1 to 106_n (n=4) the RSS variations are calculated adding directive noise, modeled using equation (3):

$$r_{t,i}(x,y,\phi) = P_{Rx,i}(d,\phi) + (A + B\,\cos(\phi_d - \phi - \phi_n)) \cdot v_{d,n} \qquad (14)$$

In FIG. 6a the results of one simulation run for standard Wi-Fi positioning (circles) using an omni-directional antenna are presented together with the reference path and the reference attitudes (gray arrows). As shown in FIG. 6a, the positioning results are distributed around the path. In FIG. 6b, the results are presented for the new attitude and position tracking (black arrows) using the setup 106 with the four directional antennas 106_1 to 106_n (n=4) and $\sigma_o$=1 dB and $\sigma_d$=1 dB.

To get more general results when applying stochastic RSS variations, processing of the path can been repeated 20 times with the same values of $\sigma_o$ or $\sigma_d$. The influences of $\sigma_o$ and $\sigma_d$ are studied separately, the other parameter is set to zero.

Figure 7B:
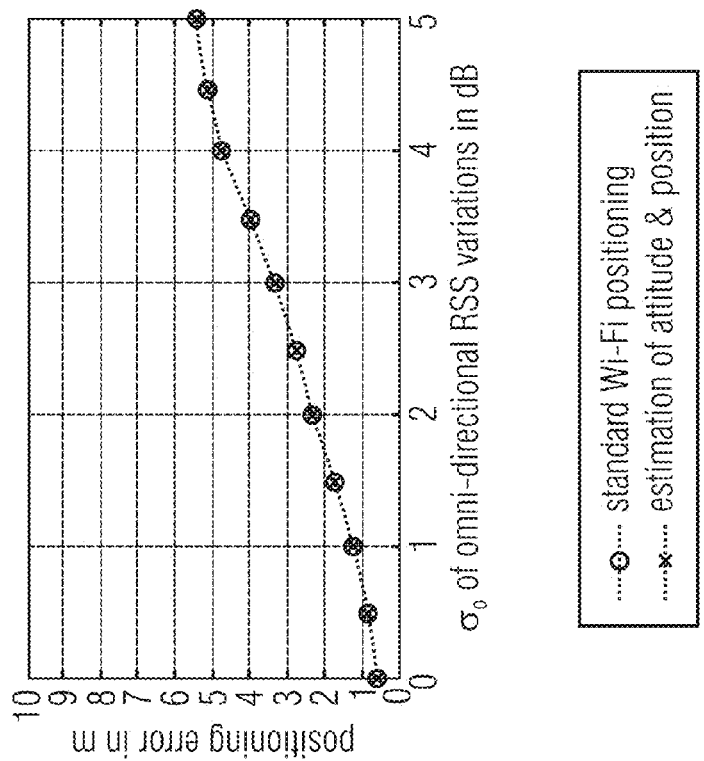
FIG. 7b shows a diagram of the positioning error as a function of omni-directional RSS variations.
Figure 7A:
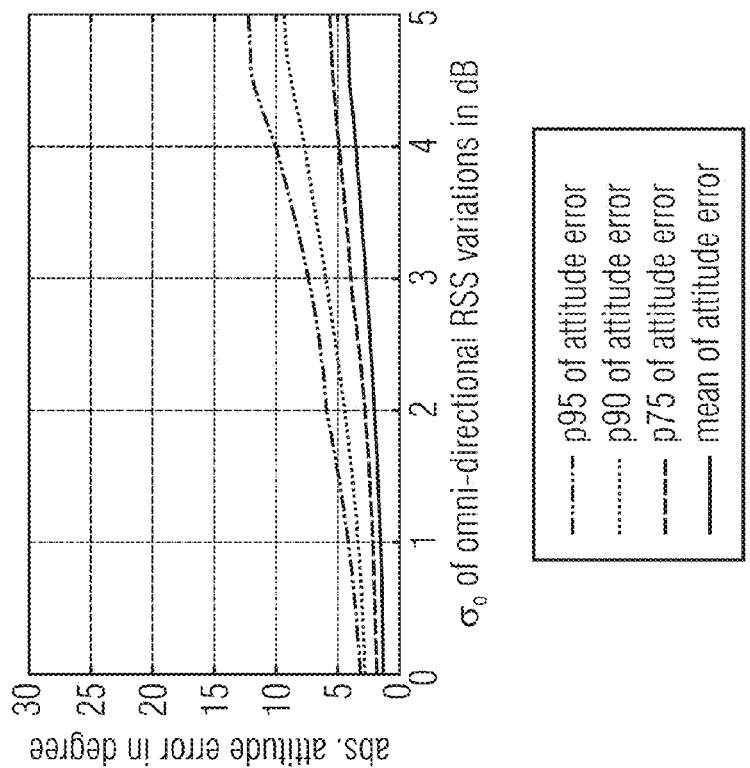
FIG. 7a shows a diagram of the absolute attitude error as a function of omni-directional RSS variations.
Figure 7D:
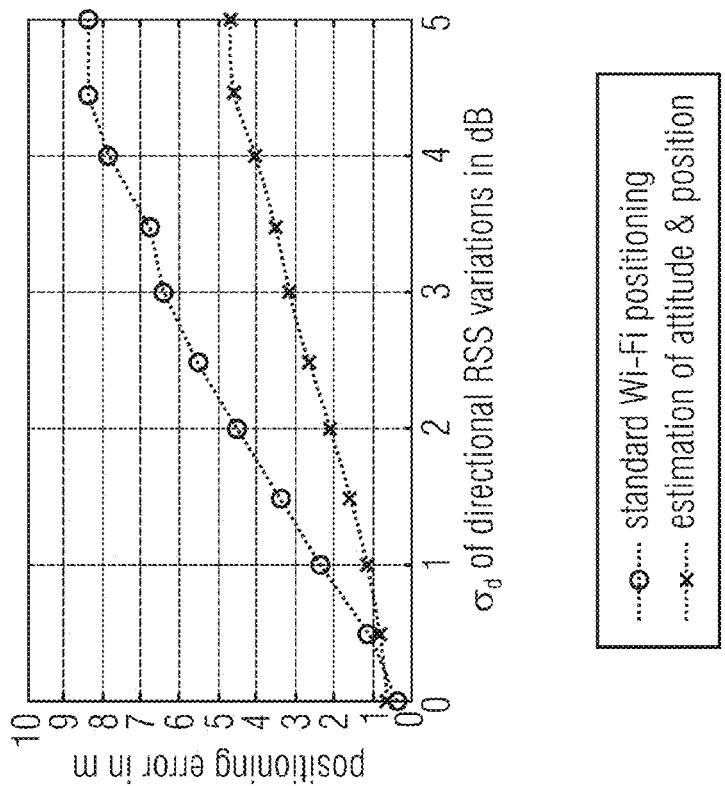
FIG. 7d shows a diagram of the positioning error as a function of directional RSS variations.
Figure 7C:
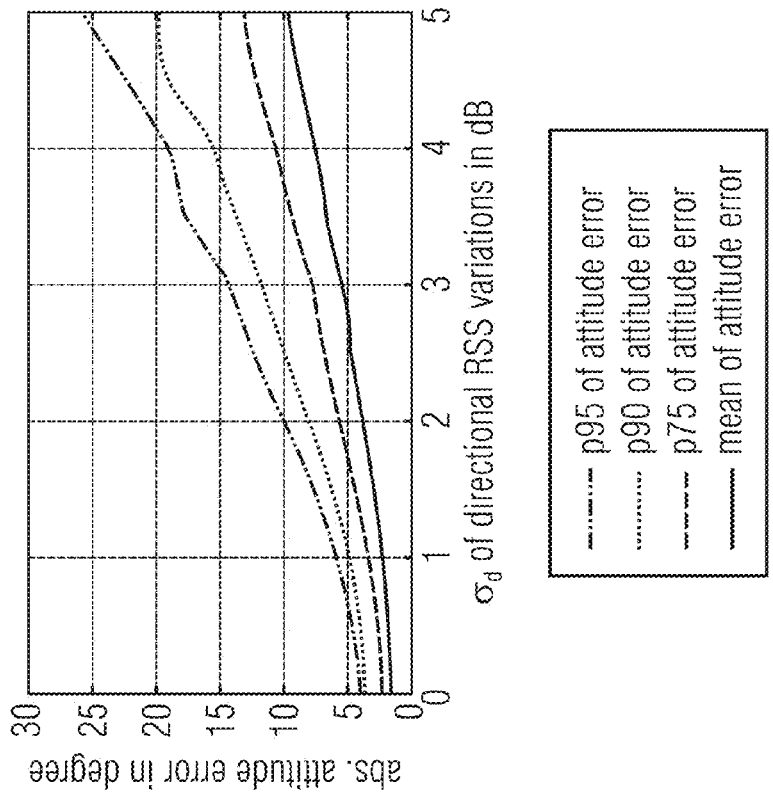
FIG. 7c shows a diagram of the absolute attitude error as a function of the directional RSS variations.

In FIG. 7a the attitude estimation results for various $\sigma_o$ and in FIG. 7c for various $\sigma_d$ are presented. The corresponding positioning results are shown in FIG. 7b and FIG. 7d together with the positioning results of standard Wi-Fi positioning, for the purpose of comparison.

For various $\sigma_o$ the positioning results are nearly the same and the attitude error is quite small. The attitude error increases with higher $\sigma_o$, because the error when calculating angle between the transceiver and receiver position $\phi_{tr}$ increases with increasing positioning errors.

On the one hand, with directional RSS variations $\sigma_d$ in FIGS. 7c and 7d the attitude estimation errors are higher: 95% of all errors stay below 30°. So, the directional RSS variations have a bigger impact on attitude estimation.

On the other hand, the positioning errors with the novel approach are almost half of standard fingerprinting. The reason is, that the virtual omni-directional RSS values from equation (11) are more precise, because the measured RSS values of the directional antennas 106_1 to 106_n are not affected in the same way by the directional noise. So, the EKF filters the measurements and estimates a good attitude candidate. Hence, the presented approach for attitude and position estimation is more robust to directional RSS variations.

In the following, experimental results of attitude and position estimation with the mobile device 100 according to the concept of the present invention are presented. In other words, subsequently, a proof of the inventive concept with real data is presented. The data has been collected at the "Museum Industriekultur" in Nuremberg. Results from the above presented simulations are compared to results from the experimental setup. RSS measurements have been collected with an omni-directional and a directional antenna at 45 positions in a room for special exhibitions at the museum.

Figure 8A:
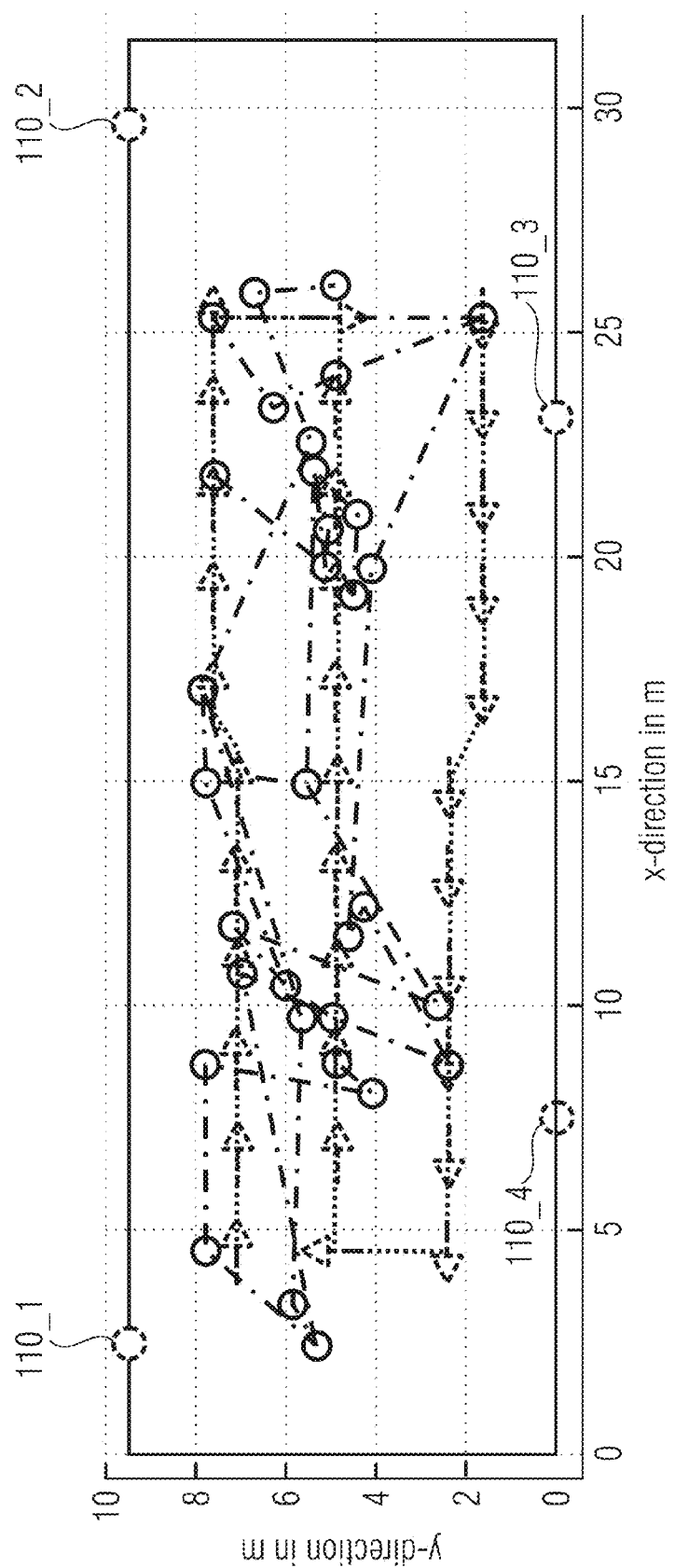
FIG. 8a shows a layout of a room with four access points (grey dots), a reference path with attitudes (grey arrows) and experimental results from standard Wi-Fi positioning (circles)
Figure 8B:
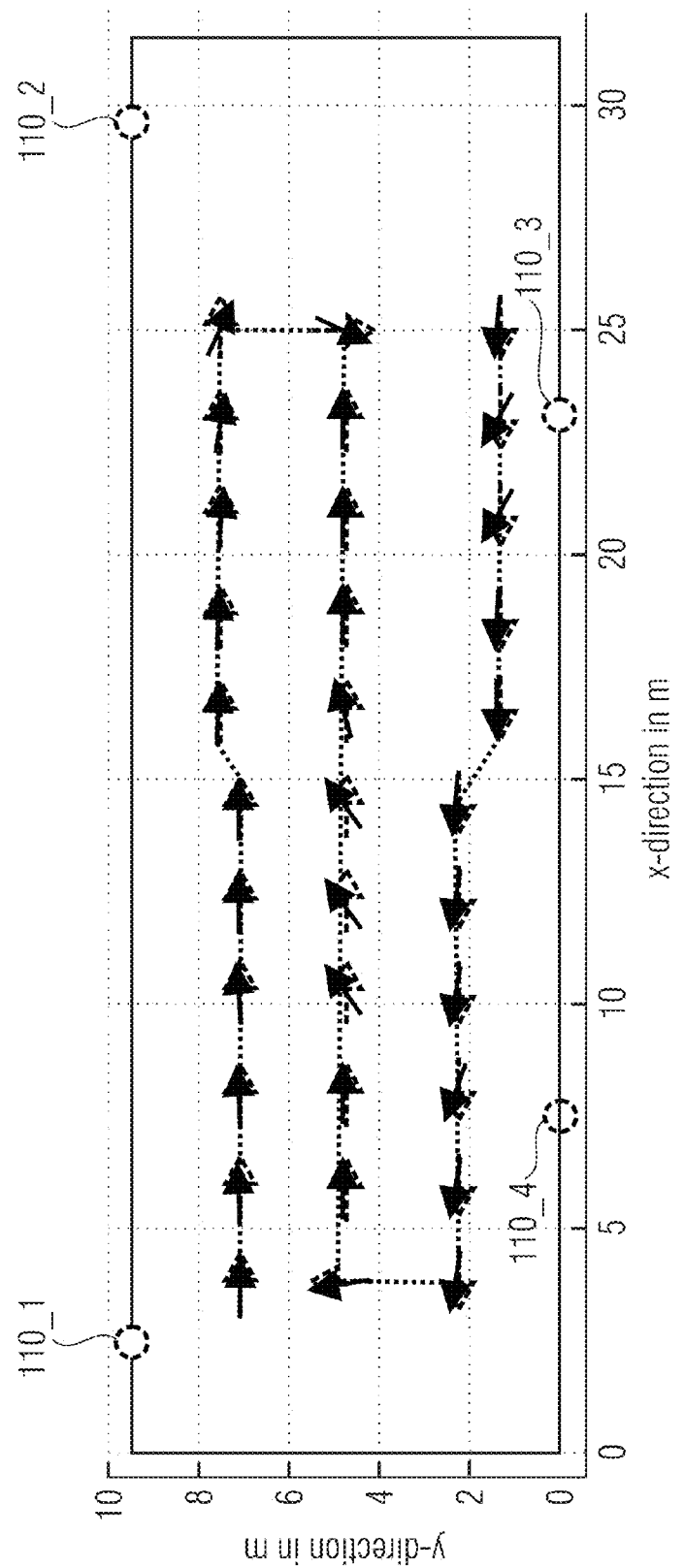
FIG. 8b shows a layout of a room with four access points (grey dots), a reference path with attitudes (grey arrows) and experimental attitude and position estimation (black arrows) according to the concept of the present invention.
Figure 9B:
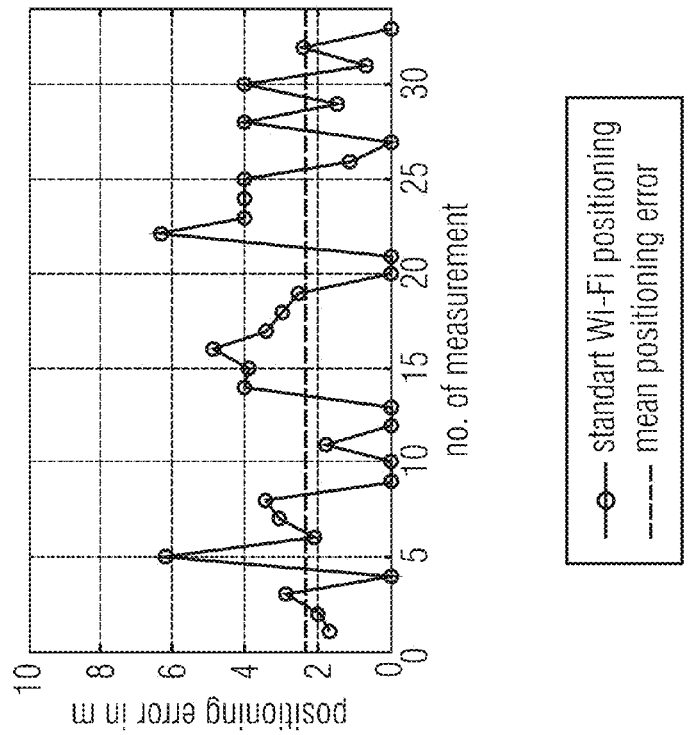
FIG. 9b shows a diagram of the positioning error of the experimental position estimation shown in FIG. 8b as a function of the number of measurements.
Figure 9A:
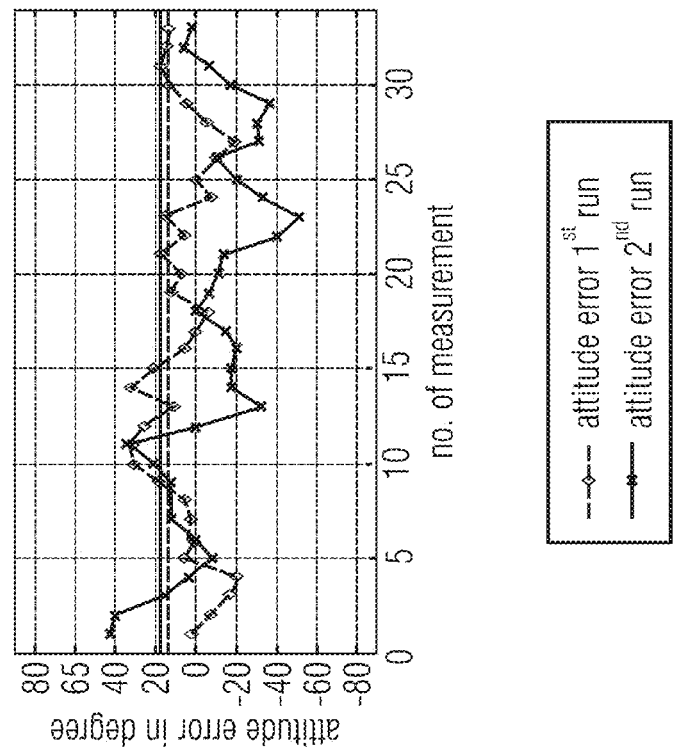
FIG. 9a shows a diagram of the attitude error of the experimental attitude estimation shown in FIG. 8b as a function of the number of measurements.

As the special antenna setup with four directional antennas 106_1 to 106_n (n=4) as shown in FIGS. 3, 4 and 5a is not yet ready for Wi-Fi transmission a commercial directional antenna (PA-2408A patch antenna: 2.4 GHz wavelan antenna 8 dbi, WiMo Antennen and Elektronik GmbH. http://www.wimo.com) has been used. It has been rotated manually at every measurement position. At first, the data for the fingerprinting database has been collected at each position with the omni-directional antenna. Secondly, RSS measurements at 33 positions on a path as depicted in FIGS. 8a and 8b have been performed with both antennas. Thereby, the omni-directional measurements for standard Wi-Fi positioning were used. In FIG. 8a positioning results using standard Wi-Fi fingerprinting are shown. Because the test setup is one single room without much shadowing objects, a challenging area for Wi-Fi positioning, the positioning error is higher than in FIG. 6a from simulations. The RSS measurements of the directional antennas 106_1 to 106_n have been used to test the attitude estimation with the EKF. The attitude estimation results of one run are depicted in FIG. 8b. The corresponding attitude and positioning errors are presented in FIGS. 9a and 9b, respectively. Thereby, FIG. 9a shows the absolute attitude errors (solid lines) and mean absolute attitude errors (dotted lines) in degree for two measurement runs using the EKF, where FIG. 9b shows the corresponding positioning errors (solid line) and the mean positioning error (dotted line) using standard Wi-Fi positioning.

Note that attitude and position estimation have been tested separately. For attitude estimation, the reference positions instead of the estimated positions have been used to calculate $\phi_{tr}$. So, the arrows representing the attitude in FIG. 8b are at the reference positions.

In this first test with an experimental setup the absolute attitude errors are less than 50° with mean values lower than 20°. This is promising enough for a museum visitor to find exhibits easily. The Wi-Fi positioning errors are typical for indoor environments with a mean error of 2.3 m.

Embodiments of the present invention expand the state of the art Wi-Fi positioning in indoor environments. RSS measurements are collected simultaneously with four directional antennas 106_1 to 106_n in a special antenna setup 106. An extended Kalman filter can be used for robust attitude estimation. For positioning, standard Wi-Fi fingerprinting can be used with existing fingerprinting databases.

Simulation results demonstrate that with the novel approach the accuracy of positioning can be improved in presence of directional RSS variations. This leads to higher robustness in position tracking. The mean value of the absolute attitude errors stayed below 10° and the positioning errors below 5 m even with large RSS variations. Tests in a museum proofed the feasibility of the concept according to present invention. The mean of the absolute attitude errors stayed below 20° in this case.

The presented approach for attitude and position tracking in indoor environments addresses the automation of electronic museum guides. Furthermore, the approach according to the present invention can be combined with existing movement models and probabilistic concepts for pedestrian navigation, using e.g. hidden Markov models, to increase the accuracy of attitude and position tracking.

Embodiments of the present invention provide an approach for pedestrian navigation in indoor environments. It addresses mobile platforms with low processing power and low-cost sensors. Thereby, four horizontally arranged directional antennas 106_1 to 106_n (n=4) can be used to collect the Wi-Fi signal strengths of transmitters (access points) 110_1 to 110_i in range. For attitude estimation an extended Kalman filter can be used, and for position tracking Wi-Fi fingerprinting. With this approach the attitude of a mobile device 100 can be estimated and the position can be tracked in indoor environments like e.g. museums. This enables the use of electronic guides that offer additional information by means of augmented reality on exhibits in visual range.

Embodiments according to the invention create a simultaneous estimation of orientation and position using signal strength measurements in wireless communication nets and directional antennas 106_1 to 106_n.

Embodiments according to the invention create an estimation of orientation and position based on signal strength.

In some embodiments, the signal strengths of signals 108_1 to 108_i from multiple transmitters 110_1 to 110_i of a wireless communication net are measured as simultaneously (or as contemporaneously) as possible using multiple directional antennas 106_1 to 106_n at a receiver 102. Alternatively, the signals of one respective transmitter can be recorded (or received) by multiple receivers using directional antennas. Herewith, orientation and position of the receiver are estimated simultaneously. The following side information items support the method and improve its quality: positions of some stationary communication partners, directional characteristics and arrangement of the directional antennas.

Some embodiments according to the invention can be used in the wireless local area network positioning (WLAN positioning).

Further embodiments of the present invention provide a method for operating a mobile device, the method comprises the steps of receiving a signal from a stationary transmitter with a receiver comprising a plurality of antennas, wherein each antenna of the plurality of antennas is arranged to have a different receiving direction; detecting a signal strength of the signal received which each antenna in order to obtain a plurality of detected signal strengths; and determining an orientation of the mobile device relative to the stationary transmitter based on the plurality of detected signal strengths.

Naturally, the above described concept for determining the orientation of a mobile device 100 can also be used for determining an orientation of a stationary device relative to a stationary and/or mobile transmitter.

Therefore, further embodiments of the present invention provide a stationary device comprising a receiver and an orientation determiner. The receiver comprises a plurality of antennas for receiving a signal from a transmitter (e.g. a stationary and/or mobile transmitter), wherein each antenna of the plurality of antennas is arranged to have a different receiving direction, and wherein the receiver is configured to detect a signal strength of the signal received which each antenna in order to obtain a plurality of detected signal strengths. The orientation determiner is configured to determine an orientation of the stationary device relative to the transmitter based on the plurality of detected signal strengths.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device, comprising:
a receiver comprising a plurality of antennas for receiving at least three signals from at least three W-Fi access points, wherein each antenna of the plurality of antennas is arranged to comprise a different receiving direction, and wherein the receiver is configured to detect signal strengths of the at least three signals received with each antenna in order to acquire a plurality of detected signal strengths for each signal of the at least three signals;
an orientation determiner configured to determine an orientation of the device relative to the at least three Wi-Fi access points based on the plurality of detected signal strengths for each signal of the at least three signals and based on a Wi-Fi fingerprinting database; and a position determiner configured to determine a position of the device relative to the at least three Wi-Fi access points based on the plurality of detected signal strengths for each signal of the at least three signals and based on the Wi-Fi fingerprinting database;

wherein the position determiner is configured to convert the plurality of detected signal strengths for each signal of the at least three signals into an equivalent single signal strength for each signal of the at least three signals, wherein each plurality of detected signal strengths is converted into the equivalent single signal strength such that the equivalent single signal strength corresponds to a signal strength detected with a receiver comprising a single omnidirectional antenna; and wherein the position determiner is configured to determine the position of the device based on the equivalent single signal strengths for each signal of the at least three signals.

2. The device according to claim 1, wherein the plurality of antennas are arranged such that the receiving directions of the plurality of antennas lie in one plane.

3. The device according to claim 2, wherein the one plane is arranged parallel to a main surface of the device that is allocated in a normal operation towards a user of the device.

4. The device according to claim 1, wherein the plurality of antennas are directional antennas.

5. The device according to claim 1, wherein the plurality of antennas are four antennas, wherein the four antennas are arranged such that the receiving directions of the four antennas are orthogonal to each other.

6. The device according to claim 1, wherein the orientation determiner is configured to determine the orientation of the device such that the orientation of the device is a horizontal orientation of the device perpendicular to an earth gravitational vector and/or a vertical orientation of the device parallel to the earth gravitational vector.

7. The device according to claim 1, wherein the orientation determiner is configured to determine the orientation of the device based on differences between the plurality of detected signal strengths.

8. The device according to claim 1, wherein the orientation determiner is configured to determine the orientation of the device by using an extended Kalman filter.

9. The device according to claim 1, wherein the position determiner comprises a memory having stored thereon the Wi-Fi fingerprinting database, wherein each entry of the W-Fi fingerprinting database comprises a reference position and reference single signal strengths for each signal of the at least three signals at the reference position, wherein the position determiner is configured to determine the position of the device based on a correlation of the equivalent single signal strengths with reference signal strengths of the database.

10. The device according to claim 1, wherein the device is a mobile device or a stationary device.

11. A method for operating a device, the method comprising:

receiving at least three signals from at least three W-Fi access points with a receiver comprising a plurality of antennas, wherein each antenna of the plurality of antennas is arranged to comprise a different receiving direction;

detecting signal strengths of the at least three signals received with each antenna in order to acquire a plurality of detected signal strengths for each signal of the at least three signals;

determining an orientation of the device relative to the at least three Wi-Fi access points based on the plurality of detected signal strengths for each signal of the at least three signals and based on a Wi-Fi fingerprinting database; and determining a position of the device relative to the at least three Wi-Fi access points based on the plurality of detected signal strengths for each signal of the at least three signals and based on the Wi-Fi fingerprinting database;

wherein determining the position comprises converting the plurality of detected signal strengths for each signal of the at least three signals into an equivalent single signal strength for each signal of the at least three signals, wherein each plurality of detected signal strengths is converted into the equivalent single signal strength such that the equivalent single signal strength corresponds to a signal strength detected with a receiver comprising a single omnidirectional antenna; and wherein the position of the device is determined based on the equivalent single signal strengths for each signal of the at least three signals.

12. A computer program comprising a program code for performing, when running on a computer or microprocessor, a method according to claim 11.

* * * * *

UNITED STATES PATENT AND TRADEMARK OFFICE
CERTIFICATE OF CORRECTION

| | | |
|---|---|---|
| PATENT NO. | : 9,529,075 B2 | Page 1 of 1 |
| APPLICATION NO. | : 14/162467 | |
| DATED | : December 27, 2016 | |
| INVENTOR(S) | : Seitz et al. | |

It is certified that error appears in the above-identified patent and that said Letters Patent is hereby corrected as shown below:

Claim 1, Column 14, Line 54:
"at least three W-Fi access"
Should read:
--at least three Wi-Fi access--

Claim 11, Column 16, Line 12:
"at least three W-Fi access"
Should read:
--at least three Wi-Fi access--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*